United States Patent [19]

Snapp, Jr. et al.

[11] 3,929,846
[45] Dec. 30, 1975

[54] ETHER TRIESTER DERIVATIVES OF P-DIOXANONE

[75] Inventors: Thomas C. Snapp, Jr.; Alden E. Blood, both of Longview, Tex.

[73] Assignee: Eastman Kodak Company, Rochester, N.Y.

[22] Filed: Sept. 25, 1974

[21] Appl. No.: 508,313

[52] U.S. Cl. .......... 260/410.6; 260/476; 260/484 A
[51] Int. Cl.² ........................................... C09F 5/08
[58] Field of Search............. 260/410.6, 484 A, 476

[56] References Cited
UNITED STATES PATENTS

| | | | |
|---|---|---|---|
| 2,962,455 | 11/1960 | Hostettler | 260/484 A |
| 3,000,747 | 9/1961 | Martin | 260/484 A |
| 3,086,044 | 4/1963 | Kerschner | 260/484 A |
| 3,689,531 | 9/1972 | Critchfield | 260/484 A |
| 3,767,627 | 10/1973 | Schoen | 260/484 A |

*Primary Examiner*—Winston A. Douglas
*Assistant Examiner*—John F. Niebling
*Attorney, Agent, or Firm*—Edward R. Weber; Daniel B. Reece, III

[57] ABSTRACT

This invention relates to a new series of ether-triester derivatives of p-dioxanone having the formula

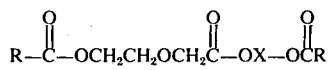

wherein R is alkyl of from 1 to 7 carbon atoms and X is an alkyl of 2 to 8 carbon atoms or $-CH_2CH_{2\,n}O_{n-1}$ where $n$ is an integer of from 2 to 4. These novel compounds are produced by reacting p-dioxanone with a glycol having from 2 to 8 carbon atoms or a glycol derived from the addition of ethylene oxide to ethylene glycol and esterifying the reaction product with a carboxylic acid having from 2 to 8 carbon atoms or a corresponding acid anhydride. These ether-triesters are particularly useful as plasticizers for polyvinyl chloride.

19 Claims, No Drawings

ETHER TRIESTER DERIVATIVES OF P-DIOXANONE

This invention relates to a new family of chemical compounds, namely ether-triester derivatives of p-dioxanone. The new compounds have the following structural formula:

wherein R is alkyl of from 1 to 7 carbon atoms and X is an alkyl of 2 to 8 carbon atoms or $-(CH_2CH_2)_nO_{n-1}$ where $n$ is an integer of from 2 to 4.

The novel ether-triesters described herein result from the selective reaction of p-dioxan-2-one (p-dioxanone) with various glycols to yield an intermediate hydroxylated ether-ester which can then be esterified. The highly selective reaction of p-dioxanone with a glycol was unexpected, since transesterification of the hydroxy ether-ester product with p-dioxanone could readily occur and p-dioxanone self-condensation would be a predicted side reaction. Neither the transesterification nor the self-condensation reaction was encountered in the synthesis of the ether-triesters.

The novel ether-triesters of this invention exhibit good utility in a broad range of applications. They have been found to be particularly effective plasticizers for polyvinyl chloride resin. The plasticizer properties of these compounds are characterized by good volatility and low temperature flexibility. Other application areas in which these compounds are useful include viscosity improvers for motor oil and brake fluid; and solvents in waxes, polishes and lubricants.

The novel ether-triesters are prepared by a two-step reaction sequence. It is believed that the reaction proceeds according to the following equations:

etc.) and N,N-dialkylanilines, alkali metal hydroxides and alkaline earth oxides. However, the desired product can be produced in a noncatalyzed reaction between the two reactants. If catalysts are used, a catalyst concentration of from about 0.01 to about 2.0 weight percent, based on the total reactant weight, should be employed. The reaction temperature at this stage should be from about 50°C. to about 150°C. The reaction can be conducted at a greater than atmospheric pressure without detrimental effects to the product. A mole ratio of glycol to lactone can be from about 1:1 to about 10:1, respectively. A preferred ratio of reactants is from about 1:1 to about 3:1, respectively.

Novel ether-triesters are produced by esterification of hydroxyalkyl β-hydroxy ethoxy acetates with a carboxylic acid of acid anhydride. The carboxylic acid or anhydride is aliphatic or aromatic in nature with a carbon chain of from 2 to 8 carbon atoms. Suitable acids or acid anhydrides for this esterification are acetic, propionic, butyric, isobutyric, pentanoic, 2-methylpentanoic, hexanoic, 2-ethylhexanoic, benzoic and toluic acid. The mole ratio of hydroxylated ester to acid moiety should be from about 1.0:2.0 to about 1.0:2.5, respectively, to insure complete esterification of the dioletherester.

Esterification with an anhydride is achieved with or without catalysis at temperatures of from about 50°C. to about 200°C. However, esterification with the carboxylic acid is enhanced by a low concentration (from about 0.01 to about 1.0 weight percent based on total weight of the reactant) of acid catalyst to produce the desired diester product. Suitable acid catalysts are sulfuric acid, p-toluenesulfonic acid, hydrochloric acid, phosphoric acid, methanesulfonic acid, and zinc chloride. An azeotropic agent such as benzene, toluene, xylene, or hexane is useful to aid water removal during the reaction.

The novel ether-triesters are viscous, colorless liquids or low melting solids which can be distilled at reduced

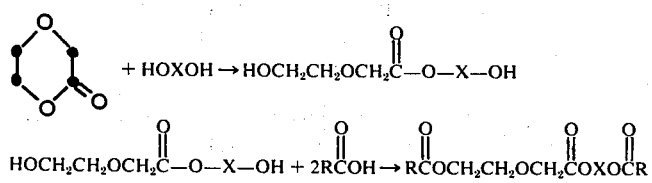

In the first step, an aliphatic glycol is reacted with p-dioxanone to produce the hydroxyalkyl-β-hydroxyethoxy acetate. In the second step of the reaction, the dihydroxylated product is esterified to give the novel triester-ethers.

The aliphatic glycols which can be used in this invention are diols having 2 to 8 carbon atoms or glycols derived from ethylene oxide in addition to ethylene glycol. Suitable glycols for this invention include ethylene glycol, neopentyl glycol, propylene glycol, 1,4-butanediol, butylene glycol, 1,6-hexanediol and and 2,3-hexanediol. Suitable polymethylene glycols include diethylene, triethylene and tetraethylene. This reaction is accomplished with an acid or basic catalyst to accelerate the reaction rate. Suitable catalysts for this reaction are sulfuric acid, organotin compounds (dibutyltin oxide, dibutyltin dilaurate, etc.), hydrochloric acid, zinc chloride, p-toluenesulfonic acid, pyridine, aliphatic tertiary amines (triethylamine, tributylamine, pressure without decomposition. Variation in physical properties (water and organic solubilities) can be readily obtained by modification of the carbon skeleton of the glycol or acid utilized. This available range of properties renders these products particularly useful as coalescing agents and plasticizers in coating and resin applications.

The process of the invention is illustrated in greater detail by the following examples which are all conducted at atmospheric pressure. It will be understood, however, that these examples are not intended to limit the invention in any way and obvious modifications will occur to those skilled in the art.

EXAMPLE 1

This example shows the synthesis of an ether-triester by reaction of p-dioxanone with a glycol to yield a dioletherester which is esterified to the desired product. In this example a 1-liter, four-neck flask is fitted with a stirrer, dropping funnel, thermometer and condenser with an attached nitrogen blanket. The flask is charged with 124 grams (2.0 moles) of ethylene glycol and heated to 100°C. Freshly distilled p-dioxanone (204 grams, 2.0 moles) is slowly added over a 30-minute period. After the addition is complete, the reaction mixture is stirred for 6 hours. To the resulting mixture at 100°C. is added 459 grams (4.5 moles) of acetic anhydride during a one hour period. Complete esterification is accomplished by heating for 6 hours at 100°C. Fractional distillation at reduced pressure affords the ether-triester which is a colorless, viscous liquid distilling at 128°–130°C. at 0.5 mm. mercury pressure in an 85 percent yield. Saponification equivalent analysis is 81.1 (theoretical is 82.7). Infrared spectroscopy verifies the ether-triester structure.

EXAMPLE 2

This example demonstrates the synthesis of an ether-triester by reaction of p-dioxanone with a glycol to yield a dioletherester which is esterified with an acid anhydride. The procedure in Example 1 is followed. A mixture of 90 grams (1 mole) of 1,4-butanediol and 1 gram of pyridine is reacted with 102 grams (1 mole) of p-dioxanone at 120°C. for 5 hours. This reaction product, a dioletherester, is mixed with 340 grams (2.1 moles) of n-butyric anhydride. Reaction of this mixture at 120°C. for 6 hours gives a yellow solution which is submitted to fractional distillation. The ether-triester product is obtained in an 86 percent yield as a colorless, viscous liquid. Saponification equivalent analysis of the product is 108 (theoretical for the ether-triester is 110.7).

EXAMPLE 3

This example describes the synthesis of an ether-triester by reaction of p-dioxanone with an ether glycol to yield a dioletherester which is esterified to the desired product. The procedure in Example 1 is followed. A mixture of 150 grams (1.0 mole) of triethylene glycol and one gram of tributylamine is reacted with 102 grams (1.0 mole) of p-dioxanone at 100°C. for 6 hours. Catalyst is removed by heating at 100°C. under reduced pressure. This reaction product is mixed with 216 grams (2.2 moles) of isobutyric acid and 1 gram of p-toluenesulfonic acid with 50 milliliters of toluene. Reflux of this mixture at 125°C. gives 35 milliliters of water. The resulting solution is submitted to fractional distillation to give an 85 percent yield of a colorless, viscous liquid. Saponification equivalent analysis of the product is 128.7 (theoretical for the ether-triester is 130.7).

Infrared and nuclear magnetic resonance spectroscopy verifies the synthesis of the ether-triester.

EXAMPLE 4

The procedure in Example 1 is followed with 106 grams (1.0 mole) of diethylene glycol reacting with 102 grams (1.0 mole) of p-dioxanone at 125°C. for 4 hours. The reaction product, a dioletherester, is mixed with 594 grams (2.2 moles) of 2-ethylhexanoic anhydride. Reaction of this mixture at 140°C. for 4 hours gives a light yellow solution which is submitted to vacuum distillation. The ether-triester product is obtained as a colorless, viscous liquid in an 81 percent yield. Saponification equivalent analysis of the product is 154.9 (theoretical for the ether-triester is 153.3).

EXAMPLE 5

The procedure in Example 1 is followed with 76 grams (1.0 mole) of propylene glycol reacting with 102 grams (1.0 mole) of p-dioxanone containing 0.5 gram of p-toluenesulfonic acid catalyst at 125°C. for 4 hours. The resulting product is mixed with 317 grams (2.2 moles) of 2-ethylhexanoic acid and 30 milliliters of toluene. Refluxing of this mixture at 140°C. gives the ether-triester with the removal of 36 milliliters of water. The resulting mixture is submitted to fractional distillation to give a colorless, viscous liquid having a saponification equivalent analysis of 145.2 (theoretical is 143.3). Infrared and nuclear magnetic resonance spectroscopy verifies the ether-triester synthesis.

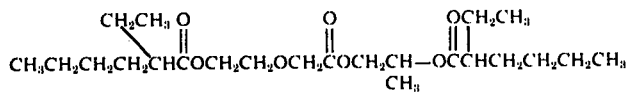

EXAMPLE 6

The procedure in Example 1 is followed with 90 grams (1.0 mole) of 1,4-butanediol reacting with 102 grams (1.0 mole) of p-dioxanone containing 0.5 gram of p-toluenesulfonic acid catalyst at 125°C. for 4 hours. The resulting product is mixed with 256 grams (2.1 moles) of benzoic acid and 30 milliliters of toluene. Refluxing of this mixture at 140°C. gives the ether-triester with the removal of 36 milliliters of water. The resulting mixture is submitted to fractional distillation to give a colorless, viscous liquid having a saponification equivalent analysis of 135.9 (theoretical is 133.3). Infrared and nuclear magnetic resonance spectroscopy verifies the ether-triester synthesis.

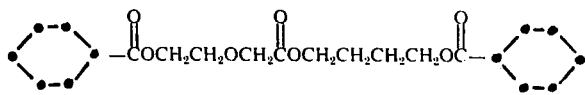

The invention has been described in detail with particular reference to preferred embodiments thereof, but it will be understood that variations and modifications can be effected within the spirit and scope of the invention as described hereinabove.

We claim:

1. A compound having the formula

wherein R is alkyl of from 1 to 7 carbon atoms and X is an alkyl of 2 to 8 carbon atoms or $-(CH_2CH_2)_nO_{n-1}$ where $n$ is an integer of from 2 to 4.

2. The ether-triester in claim 1 wherein X is alkyl with 2 carbon atoms and $R = CH_3$.

3. The ether-triester in claim 1 wherein X is alkyl with 4 carbon atoms and $R = -C_4H_9$.

4. The ether-triester in claim 1 wherein X is alkyl with 3 carbon atoms and $R = -C_7H_{15}$.

5. The ether-triester in claim 1 wherein X is $-CH_2CH_2)_nO_{n-1}$ with $n$ as 2 and $R = -C_7H_{15}$.

6. The ether-triester in claim 1 wherein X is $-CH_2CH_2)_nO_{n-1}$ with $n$ as 3 and R is phenyl.

7. A process for the production of ether-triesters having the formula

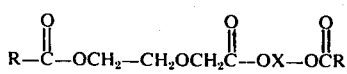

wherein R is alkyl of from 1 to 7 carbon atoms and X is an alkyl of 2 to 8 carbon atoms or $-(CH_2CH_2)_nO_{n-1}$ where $n$ is an integer of from 2 to 4, which comprises reacting p-dioxanone with an aliphatic glycol having from 2 to 8 carbon atoms or a glycol derived from the addition of ethylene oxide to ethylene glycol and subsequently esterifying the reaction product with an aliphatic carboxylic acid having from 2 to 8 carbon atoms or an anhydride thereof.

8. A process according to claim 7 wherein the glycol is selected from the group consisting of ethylene glycol, neopentyl glycol, propylene glycol, 1,4-butanediol, butylene glycol, 1,6-hexanediol, 2,3-hexanediol, diethylene glycol, triethylene glycol and tetraethylene 9. A process according to claim 7 wherein the reaction of the p-dioxanone and the glycol is conducted in the presence of a catalyst.

10. A reaction according to claim 9 wherein the acid or base catalyst is selected from the group consisting of sulfuric acid, organotin compounds hydrochloric acid, zinc chloride, p-toluenesulfonic acid, pyridine, aliphatic tertiary amines, N,N-dialkylanilines, alkali metal hydroxides and alkaline earth metal oxides.

11. A reaction according to claim 9 wherein the catalyst is present in a concentration of from about 0.01 percent to about 2.0 percent based upon the total weight of the reactant.

12. A process according to claim 7 wherein the reaction of p-dioxanone and glycol is conducted at a temperature of from about 50°C. to about 150°C.

13. A process according to claim 7 wherein the mole ratio of alcohol to p-dioxanone is from about 1:1 to about 10:1, respectively.

14. A process according to claim 13 wherein the mole ratio of alcohol to p-dioxanone is from about 1:1 to about 3:1, respectively.

15. A process according to claim 7 wherein the esterification reaction is conducted with a carboxylic acid or acid anhydride thereof selected from the group consisting of acetic, propionic, butyric, 2-methylpentanoic, hexanoic, 2-ethylhexanoic, octanoic, benzoic, or toluic acid.

16. A process according to claim 15 wherein the esterification is conducted in the presence of a catalyst selected from the group consisting of sulfuric acid, p-toluenesulfonic acid, methanesulfonic acid, hydrochloric acid, phosphoric acid or zinc chloride.

17. A process according to claim 16 wherein the esterification catalyst is present in an amount of from about 0.01 weight percent to about 2.0 weight percent based upon the total weight of the reactants.

18. A process according to claim 15 wherein the esterification with an aliphatic carboxylic acid or acid anhydride thereof is conducted at a temperature of from about 75°C. to about 200°C.

19. A process according to claim 7 wherein the mole ratio of intermediate hydroxylated ester to acid moiety is from about 1:2 to about 1:2.5, respectively.

* * * * *

PO-1050
(5/69)

UNITED STATES PATENT OFFICE
CERTIFICATE OF CORRECTION

Patent No. 3,929,846      Dated December 30, 1975

Inventor(s) Thomas C. Snapp, Jr., Alden E. Blood

It is certified that error appears in the above-identified patent and that said Letters Patent are hereby corrected as shown below:

Column 5, line 29, delete "$-CH_2CH_2)_nO_{n-1}$" and insert therefor --- $(CH_2CH_2)_nO_{n-1}$ ---.

Column 5, line 31, delete "$-CH_2CH_2)_nO_{n-1}$" and insert therefor --- $(CH_2CH_2)_nO_{n-1}$ ---.

Column 6, line 4, after "tetraethylene" insert ---glycol.---.

Column 6, line 10, insert a comma (,) after "organotin compounds".

Signed and Sealed this sixteenth Day of March 1976

[SEAL]

Attest:

RUTH C. MASON
*Attesting Officer*

C. MARSHALL DANN
*Commissioner of Patents and Trademarks*